US008505358B2

(12) United States Patent
DeNatale et al.

(10) Patent No.: US 8,505,358 B2
(45) Date of Patent: Aug. 13, 2013

(54) METHOD FOR ADJUSTING RESONANCE FREQUENCIES OF A VIBRATING MICROELECTROMECHANICAL DEVICE

(75) Inventors: Jeffrey F. DeNatale, Thousand Oaks, CA (US); Philip A. Stupar, Oxnard, CA (US)

(73) Assignee: Teledyne Scientific & Imaging, LLC, Thousand Oaks, CA (US)

(*) Notice: Subject to any disclaimer, the term of this patent is extended or adjusted under 35 U.S.C. 154(b) by 0 days.

(21) Appl. No.: 13/235,265

(22) Filed: Sep. 16, 2011

(65) Prior Publication Data

US 2012/0006787 A1   Jan. 12, 2012

Related U.S. Application Data

(62) Division of application No. 12/255,576, filed on Oct. 21, 2008, now Pat. No. 8,327,684.

(51) Int. Cl.
   *G01P 21/00*   (2006.01)
   *G01C 19/56*   (2012.01)
   *H01L 41/22*   (2013.01)
   *C23F 1/02*    (2006.01)
   *G01C 25/00*   (2006.01)
   *G12B 13/00*   (2006.01)

(52) U.S. Cl.
   USPC ......... 73/1.37; 73/1.77; 73/504.12; 29/25.35; 216/41; 216/48

(58) Field of Classification Search
   USPC ............... 73/1.37, 1.77, 504.12; 216/41, 48, 216/51
   See application file for complete search history.

(56) References Cited

U.S. PATENT DOCUMENTS

| 4,080,696 | A | 3/1978 | Shimatsu |
| 5,604,311 | A | 2/1997 | Kumar et al. |
| 6,249,074 | B1 | 6/2001 | Zimnicki et al. |
| 6,424,241 | B2 | 7/2002 | Mordkovich |
| 6,601,276 | B2 | 8/2003 | Barber |
| 6,629,460 | B2 | 10/2003 | Challoner |
| 6,698,287 | B2 | 3/2004 | Kubena et al. |
| 7,040,163 | B2 | 5/2006 | Shcheglov et al. |
| 7,102,467 | B2 * | 9/2006 | Lutz et al. ..................... 333/186 |
| 7,170,369 | B2 | 1/2007 | Huang et al. |
| 7,489,063 | B2 | 2/2009 | Isobe et al. |
| 8,327,684 | B2 * | 12/2012 | DeNatale et al. .............. 73/1.37 |
| 2007/0096850 | A1 | 5/2007 | Huang et al. |
| 2009/0095077 | A1 | 4/2009 | DeNatale et al. |

OTHER PUBLICATIONS

"Frequency Trimming for MEMS Resonator Oscillators," Hsu et al., *IEEE*, pp. 1088-1091, 2007.
"Post-Packaging Frequency Tuning of Microresonators by Pulsed Laser," Chiao et al., *Journal of Micromechanics and Microengineering*, vol. 14, pp. 1742-1747, 2004.
"Analysis and Fabrication of MEMS Tunable Piezoelectric Resonators," Amanda A. Frederick, University of Pittsburgh, 141 pages, 2006.
Wang, Kun et al., "VHF Free-Free Beam High-Q Micromechanical Resonators", Journal of Micromechanical Systems, vol. 9, No. 3, Sep. 2000, pp. 347-360.

* cited by examiner

*Primary Examiner* — Daniel Larkin
(74) *Attorney, Agent, or Firm* — Snell & Wilmer, LLP

(57) ABSTRACT

The present invention relates to a method for adjusting the resonant frequencies of a vibrating microelectromechanical (MEMS) device. In one embodiment, the present invention is a method for adjusting the resonant frequencies of a vibrating mass including the steps of patterning a surface of a device layer of the vibrating mass with a mask, etching the vibrating mass to define a structure of the vibrating mass, determining a first set of resonant frequencies of the vibrating mass, determining a mass removal amount of the vibrating mass and a mass removal location of the vibrating mass to obtain a second set of resonant frequencies of the vibrating mass, removing the mask at the mass removal location, and etching the vibrating mass to remove the mass removal amount of the vibrating mass at the mass removal location of the vibrating mass.

15 Claims, 9 Drawing Sheets

METHOD FOR ADJUSTING RESONANCE FREQUENCIES OF A VIBRATING MICROELECTROMECHANICAL DEVICE

CROSS REFERENCE TO RELATED APPLICATIONS

This application is a divisional application of U.S. patent application Ser. No. 12/255,576, filed on Oct. 21, 2008, now U.S. Pat. No. 8,327,684, the entire contents of which is incorporated herein by reference.

BACKGROUND

1. Field

The present invention relates to a method for adjusting the resonant frequencies of a vibrating microelectromechanical device.

2. Related Art

Vibrating masses are commonly used elements in microelectromechanical (MEMS) devices such as MEMS resonators and resonant inertial sensors. These microfabricated resonators can be used in MEMS gyroscopes to sense the rotation of the device by measuring changes in vibrational amplitudes upon rotation. In typical vibrating mass gyroscopes, the device may be driven in one axis and the vibrational amplitude sensed in another axis. An example of a resonator structure used in a MEMS gyroscope is the Disc Resonator Gyroscope (DRG) described in U.S. Pat. No. 7,347,095 entitled "Integral Resonator Gyroscope" and U.S. Patent Application Pub. No. 2007/10017287. The resonant frequencies of the device in these two axes are typically required to be identical for operation, and are designed to have common frequencies. However, the process for manufacturing MEMS resonators typically produces devices with resonant frequencies which are not precisely at the desired resonant frequency value for each vibratory axis due to production tolerances. These differences between the resonant frequencies of the MEMS resonator in the drive and sense axes are commonly called frequency splits. These splits are typically tuned into coincidence by an electronic or electromechanical means to enable device operation. Correction methods can be performed to adjust the resonant frequencies of a MEMS resonator in order to correct for frequency splits. However, such correction methods may over or under correct the resonant frequencies and thus do not produce the level of precision necessary to adequately adjust the resonant frequencies of the MEMS resonator. If the frequency split of the MEMS resonator is too large, that is, the resonant frequencies of the MEMS resonator in its operational axes deviate too much from the desired resonant frequencies coincident value, then the MEMS resonator may be inaccurate or be unsuitable for its purpose. Further, the method for implementing these corrections may be incompatible with repeatable volume manufacturing processes.

Thus, there is a need for a method to more efficiently and accurately adjust the resonant frequencies of a vibrating microelectromechanical device to reduce the frequency split of the resonator device.

SUMMARY

In one embodiment, the present invention is a method for adjusting the resonant frequencies of a vibrating mass including the steps of patterning a surface of a device layer of the vibrating mass with a mask, etching the vibrating mass to define a structure of the vibrating mass, determining a first set of resonant frequencies of the vibrating mass, determining a mass removal amount of the vibrating mass and a mass removal location of the vibrating mass to obtain a second set of resonant frequencies of the vibrating mass, removing the mask at the mass removal location, and etching the vibrating mass to remove the mass removal amount of the vibrating mass at the mass removal location of the vibrating mass.

In another embodiment, the present invention is a method for adjusting the resonant frequencies of a vibrating MEMS device including the steps of patterning a surface of the vibrating MEMS device with photoresist, the photoresist having open areas located where the MEMS device should be etched, etching the vibrating MEMS device at locations corresponding to the open areas, determining a first resonant frequency of the vibrating MEMS device along a first axis and a second resonant frequency of the vibrating MEMS device along a second axis, determining a first mass removal amount of the vibrating MEMS device and a first mass removal location of the vibrating MEMS device to alter the first resonant frequency and reduce a resonant frequency difference between the first resonant frequency and the second resonant frequency, removing the photoresist at the first mass removal locations using laser ablation, and etching the vibrating MEMS device to remove the first mass removal amount of the vibrating mass at the first mass removal location of the vibrating MEMS device.

In yet another embodiment, the present invention is a method for adjusting resonant frequencies of a vibrating MEMS device including the steps of determining a first resonant frequency of the vibrating MEMS device along the first axis and a second resonant frequency of the vibrating MEMS device along the second axis, determining a mass removal amount of the vibrating MEMS device and a mass removal location of the vibrating MEMS device to alter the first resonant frequency and reduce a resonant frequency difference between the first resonant frequency and the second resonant frequency, coating a surface of the vibrating MEMS device with a conformal masking material, removing the masking material at the mass removal location using laser ablation, and etching the vibrating MEMS device using deep reactive ion etching to remove the mass removal amount of the vibrating MEMS device at the mass removal location of the vibrating MEMS device.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Methods and systems that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the present invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
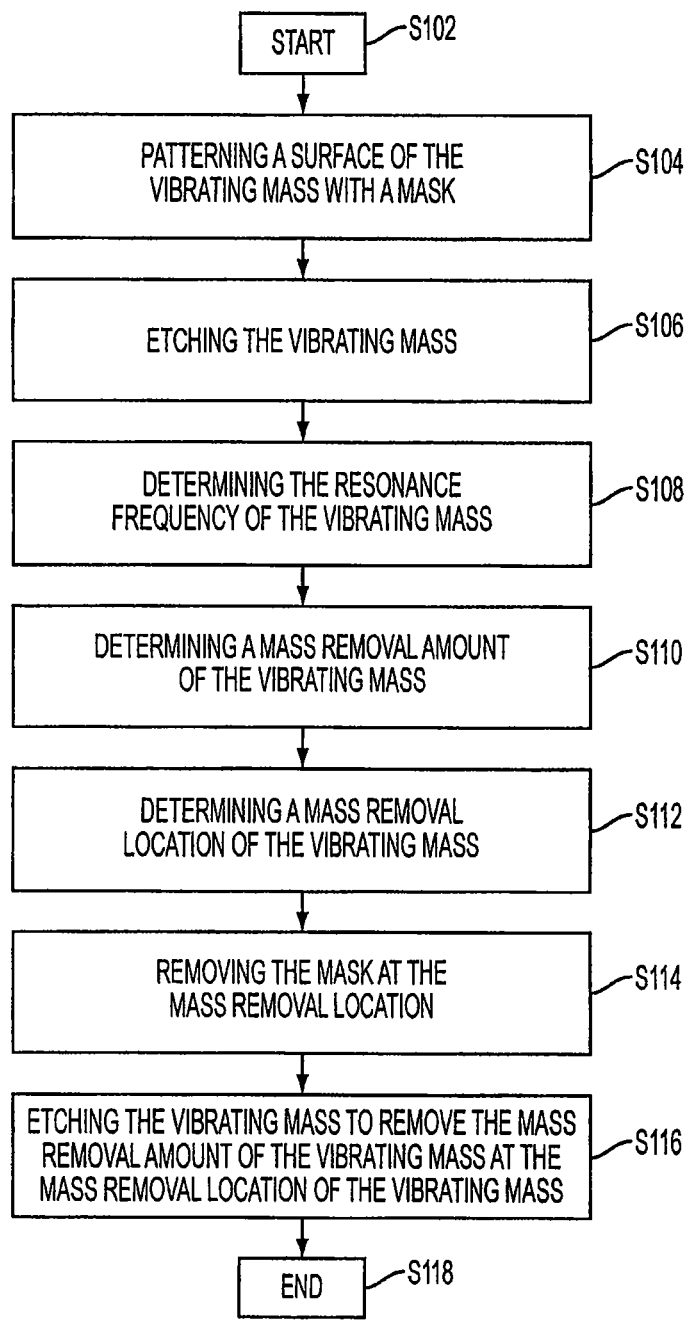
FIG. 1 is a flow chart of an embodiment of the present invention.
Figure 2:
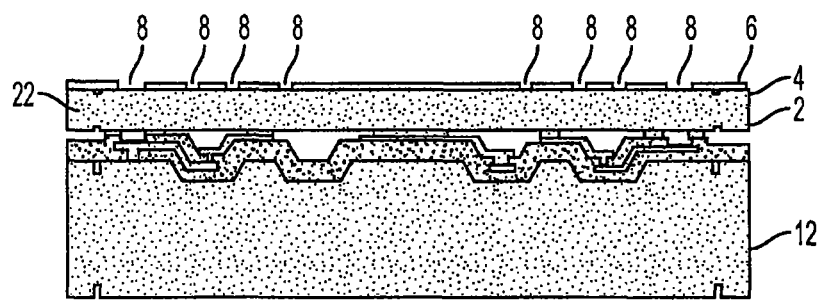
FIG. 2 is a side view of a vibrating mass.

FIG. 1 is a flow chart of an embodiment of the present invention. In Step S102, the process to adjust the resonant frequencies of a vibrating mass begins. As shown in FIG. 2, a surface 4 of a device layer 22 of vibrating mass 2 is patterned with a mask 6, in Step S104. Mask 6 can be, for example, an etch mask such as photoresist. Device layer 22 can be connected to a supporting substrate 12 that may provide mechanical and electrical interconnection to the movable elements of vibrating mass 2 as well as to the stationary elements that serve as, for example, drive and sense electrodes. Open areas 8 can be formed in mask 6 corresponding to locations in device layer 22 where material should be removed in device layer 22 to define a device structure of vibrating mass 2. Open areas 8 in the mask 6 can be formed by photolithographic processing.

Vibrating mass 2 can be any mass that vibrates and which has resonant frequencies that need to be adjusted. In one embodiment, vibrating mass 2 is a vibrating MEMS device such as a MEMS resonator. In another embodiment, vibrating mass 2 is a silicon MEMS resonator. In yet another embodiment, vibrating mass 2 is the vibrating element of a MEMS sensor. In still another embodiment, vibrating mass 2 is quartz. Likewise, device layer 22 can be formed from silicon in one embodiment and quartz in another embodiment. It is contemplated that vibrating mass 2 can be used in a gyroscope or any other device where vibrations are required. In one embodiment, vibrating mass 2 is used for navigation such as with vehicles, munitions, or personnel. In another embodiment, vibrating mass 2 is used for orientation sensing. Furthermore, vibrating mass 2 can be used undersea or in head tracker systems. Vibrating mass 2 can have any thickness, but in an exemplary embodiment, vibrating mass 2 has a thickness between approximately 100 μm to 600 μm.

In one embodiment mask 6 is photoresist. For example, mask 6 can be positive photoresist, negative photoresist, SU-8 photoresist, photoresist including a mixture of diazonaphthoquinone (DNQ) and novolac resin, deep ultraviolet photoresist, or any other type of resist. Mask 6 can be, for example between approximately 2 μm thick to 30 μm thick depending on the desired etch depth, etch rate, and selectivity to photoresist etching. In another embodiment, the mask may be an inorganic thin film, such as nickel, patterned by techniques such as etching or liftoff.

Figure 3:
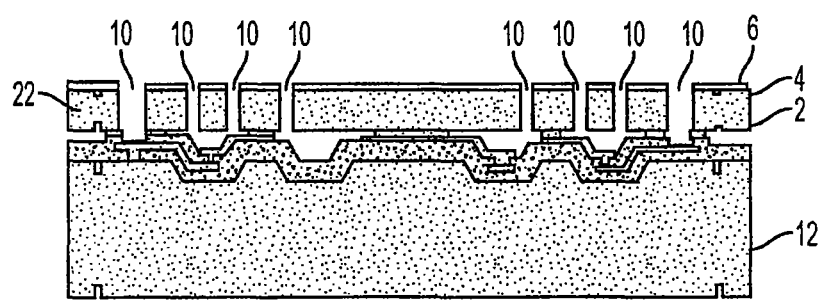
FIG. 3 is a side view of a vibrating mass.

In Step S106, vibrating mass 2 is etched at device layer 22 to form trenches 10 as shown in FIG. 3. In one embodiment, vibrating mass 2 can be etched using deep reactive ion etching. In another embodiment, vibrating mass 2 is etched using deep reactive ion etching using a time-sequenced etch and passivate chemistry, such as using sulfur hexafluoride, SF6, for the etching and octafluorocyclobutane, C4F8, for the passivation in a process commonly known as the Bosch process.

In Step S108, vibrating mass 2 is analyzed to determine if the resonant frequencies of vibrating mass 2 need to be adjusted and locations of vibrating mass 2 where mass should be removed from device layer 22 to achieve the desired resonant frequencies of vibrating mass 2. For example, if vibrating mass 2 has a resonant frequency of approximately 14.950 kHz in a first axis and a resonant frequency of approximately 14.900 kHz in a second axis, then vibrating mass 2 should be adjusted to decrease the resonant frequency of the first axis by 50 Hz to bring the values for both the first axis and the second axis into conformity at a common resonant frequency of approximately 14.900 kHz.

Adjusting the resonant frequencies of vibrating mass 2 can be done, for example, by removing select amounts of mass from select locations of vibrating mass 2. In Step S110, the mass removal amount of device layer 22 is determined while in Step S112, the mass removal location of device layer 22 is determined. In one embodiment, mask 6 remains on vibrating mass 2 when analysis of vibrating mass 2 is performed. It is contemplated that since mask 6 may be approximately 6 μm or less thick while vibrating mass 2 may be 100 μm to 600 μm thick, that disproportional distributions of mask 6 may have a negligible effect on the analysis of vibrating mass 2. This may be especially true where it is unlikely that mask 6 will be distributed unevenly in a significant manner throughout vibrating mass 2.

Figure 4:
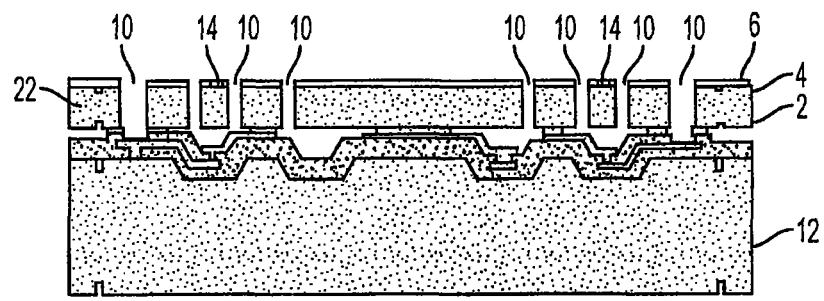
FIG. 4 is a side view of a vibrating mass.
Figure 6:
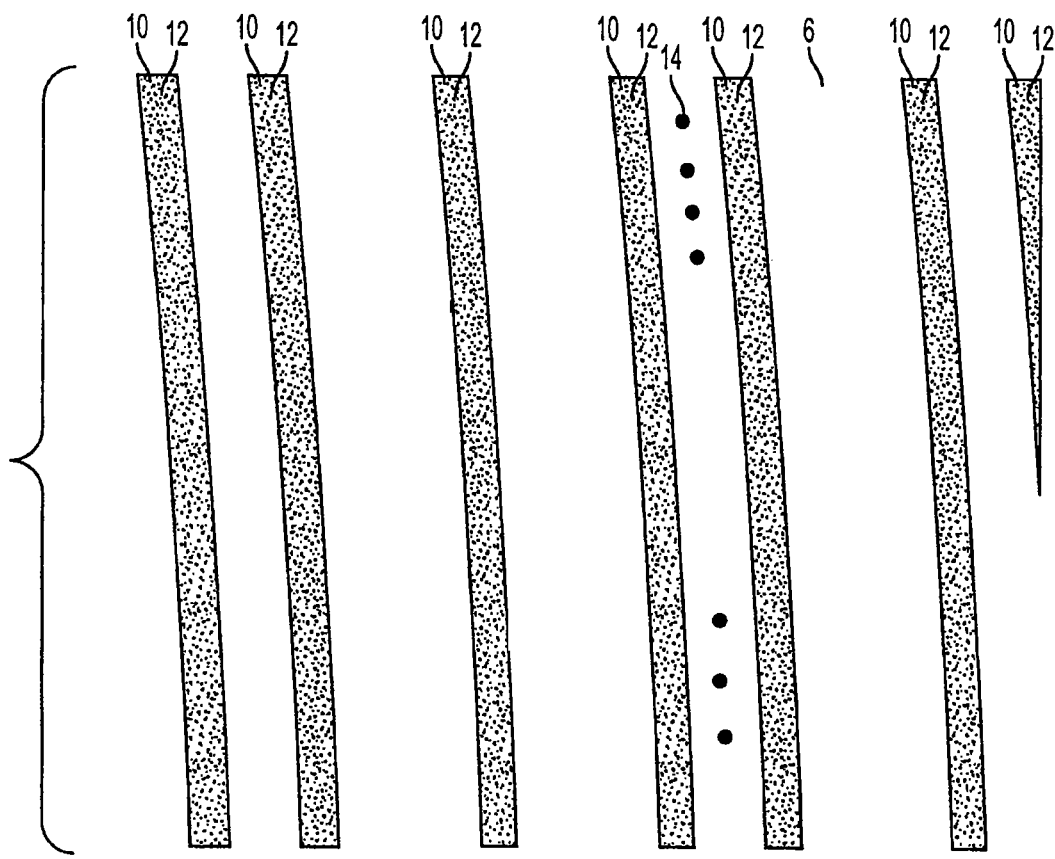
FIG. 6 is a top view of a vibrating mass.

In Step S114, select locations of mask 6 are removed corresponding to the select locations of vibrating mass 2 as shown in FIGS. 4 and 6. FIG. 4 is a side view of vibrating mass 2 while FIG. 6 is a top view of vibrating mass 2. In FIGS. 4 and 6, trenches 10 expose supporting substrate 12. As shown in FIGS. 4 and 6, select holes 14 are created in mask 6 corresponding to select locations where mass from device layer 22 should be removed so that vibrating mass 2 can have the desired resonant frequencies. In one embodiment, mask 6 is removed through laser ablation. It is contemplated that by using a low energy laser ablation, the amount of mask 6 that is removed can be better controlled when compared with a high energy laser ablation. Furthermore, with the use of a low energy laser ablation, it is contemplated that less debris can be created. With less debris, there is less chance that the debris will affect the operation and yield of the device. At low energies, the masking resist layer can be removed without damaging the underlying material of device layer 22. In one embodiment, the low energy laser ablation can be performed using a laser system commonly used for trimming electronic components and reworking electronic circuits. The low energy laser ablation can have a spot size of approximately 1 μm to 10 μm, pulse energy of approximately 0.1 mJ to 2.0 mJ, and wavelengths of approximately 266 nm to 1064 nm.

Furthermore, equipment for low energy laser ablation may be cheaper, more compact and more readily available than equipment for high energy laser ablation. This can allow the low energy laser ablation equipment to be placed within a closer location to an area where steps S104 and S106 are performed which can lead to quicker processing and production of vibrating mass 2 with the desired resonant frequencies. This can reduce the production time for the device incorporating vibrating mass 2 and thus increase the number of devices incorporating vibrating mass 2 that are produced within a given period of time. This can also eliminate the need to remove the device from the clean production area, reducing the likelihood of introducing particulate contamination.

Figure 5:
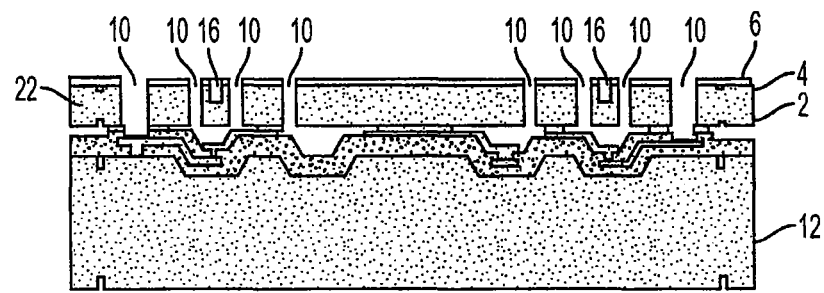
FIG. 5 is a side view of a vibrating mass.

In Step S116, vibrating mass 2 is etched to remove select amounts of mass at select locations of vibrating mass 2 forming blind vias or cavities 16 as shown in FIG. 5. In one embodiment, vibrating mass 2 can be etched using deep reactive ion etching. In another embodiment, vibrating mass 2 can be etched using deep reactive ion etching using time-sequenced etch and passivate chemistries such as the Bosch process using sulfur hexafluoride, SF6, and octafluorocyclobutane, C4F8. These cavities 16 may be of any arbitrary shape, and may include, for example, cylinders, squares, or linear trenches. After etching vibrating mass 2, it is contemplated that the resonant frequencies of vibrating mass 2 can be adjusted to approximately the desired resonant frequencies. For example, if vibrating mass 2 originally has a resonant frequency of 14.950 kHz on the first axis and 14.900 kHz on the second axis, but vibrating mass 2 should have a common resonant frequency of 14.900 kHz on both axes, then after etching, vibrating mass 2 can have a resonant frequency of approximately 14.900 kHz on both axes. In step S112, the process ends.

In some cases, vibrating mass 2 may have a frequency split even after performing the steps of FIG. 1. For example, vibrating mass 2 can have a resonant frequency of 14.9905 kHz on the first axis and 14.990 kHz on the second axis when the desired common resonant frequency is 14.990 kHz. The present invention, however, advantageously reduces the frequency split of vibrating mass 2.

Furthermore by using the steps disclosed in FIG. 1, it is contemplated that vibrating mass 2 can remain in a production environment or foundry throughout the entire process instead of being moved to a separate location. The minimization of movements of vibrating mass 2 can reduce manufacturing costs as moving vibrating mass 2 can be costly. Furthermore, the reduction of movement is beneficial in reducing the likelihood that vibrating mass 2 will be damaged during the moving process by the introduction of particulates by virtue of its removal from a clean production environment.

It is also contemplated that the steps disclosed in FIG. 1 may be advantageously used in devices where the device frequencies are testable after Step S106 with masking layer 6 still in place and where the device can accommodate the over etch needed to remove the mass removal amount at the mass removal locations.

Although not depicted, in another embodiment, should the resonant frequencies of vibrating mass 2 still be unacceptable, any or all of Steps S106 to Step S112 can be repeated. That is, if the resonant frequencies of vibrating mass 2 is 14.9905 kHz in the first axis and 14.990 kHz in the second axis then vibrating mass 2 can have more mass removed in select new additional mass removal locations with a new additional mass removal amount such that vibrating mass 2 has a resonant frequency of 14.990 kHz in both axes. However, if the new resonant frequencies are still unacceptable, then again, any or all of Steps S106 to Step S112 can be repeated until vibrating mass 2 has suitable resonant frequencies. However, in subsequent applications of the process, the etching mask remains open in the original mass removal locations as well as any new mass removal locations defined. Thus, during subsequent etch processing mass will continue to be removed at the original mass removal locations as well as at the newly defined mass removal locations. This should be taken into consideration in defining the new mass removal locations and mass removal amounts.

Figure 7:
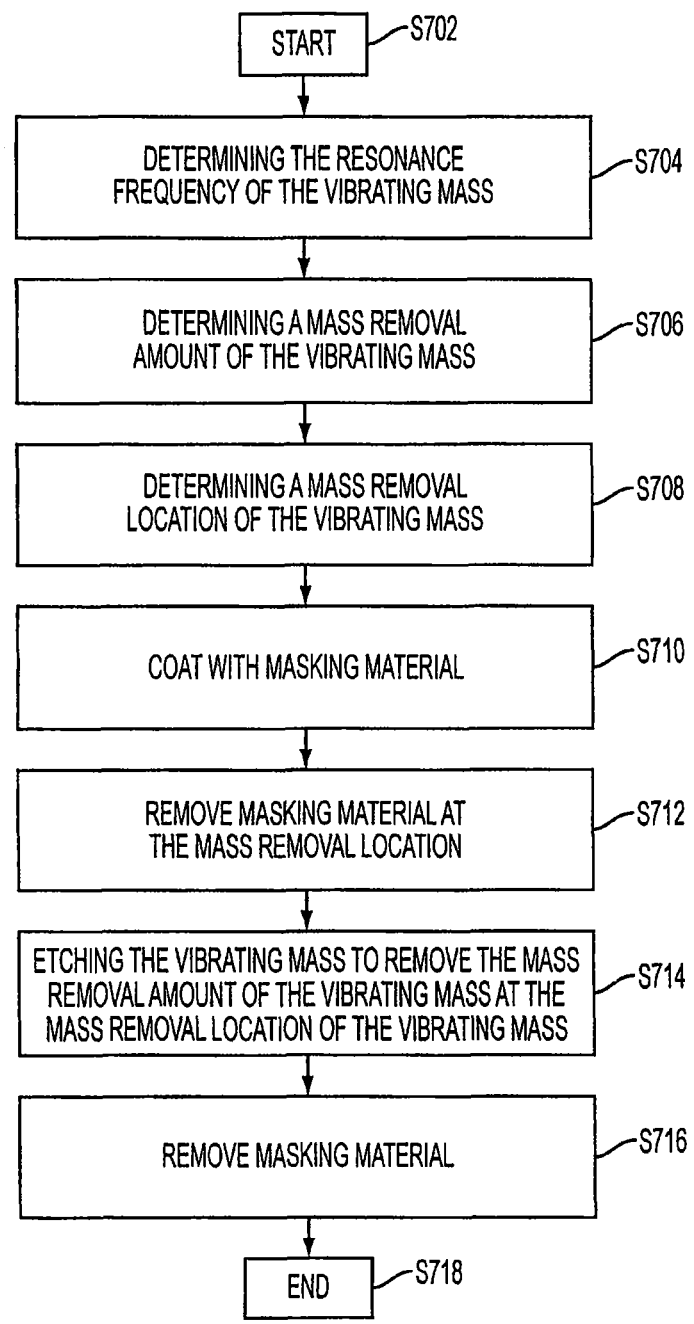
FIG. 7 is a flow chart of an alternate embodiment of the present invention.
Figure 8:
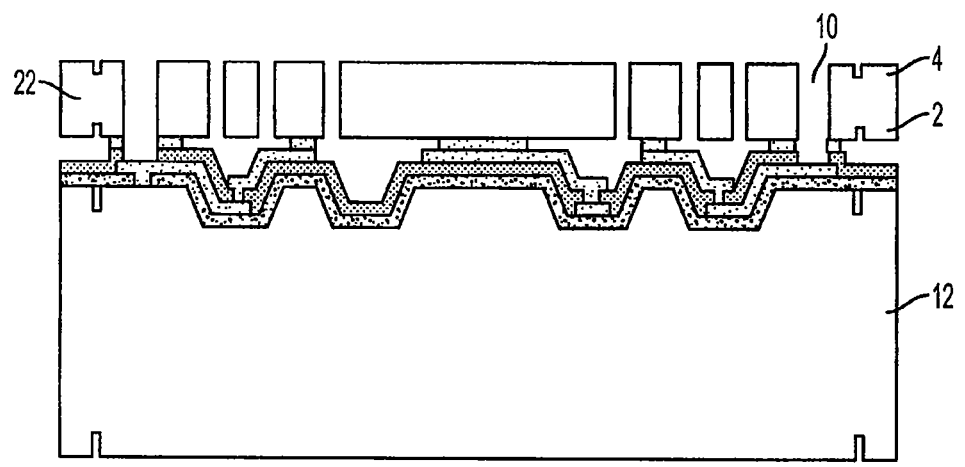
FIG. 8 is a side view of a vibrating mass.

FIG. 7 is a flow chart of an alternate embodiment of the present invention. In Step S702, the process to adjust the resonant frequencies of a vibrating mass begins. The process depicted in FIG. 7 begins by utilizing vibrating mass 2 which is already etched at device layer 22 to form trenches 10 and which already has mask 6 removed as shown in FIG. 8.

In Step S706, vibrating mass 2 is analyzed to determine if the resonant frequencies of vibrating mass 2 need to be adjusted and locations of device layer 22 where mass should be removed to achieve the desired resonant frequencies of vibrating mass 2. For example, if vibrating mass 2 has a resonant frequency of 14.950 kHz in a first axis and a resonant frequency of 14.900 kHz in a second axis, then vibrating mass 2 should be adjusted to decrease the resonant frequency of the first axis by 50 Hz to bring the values for both the first axis and the second axis into conformity at a common resonant frequency of 14.900 kHz.

To adjust the resonant frequencies of vibrating mass 2 select amounts of mass from select locations of vibrating mass 2 can be removed. In Step S706, a mass removal amount of device layer 22 is determined while in Step S708, a mass removal location of device layer 22 is determined.

Figure 9:
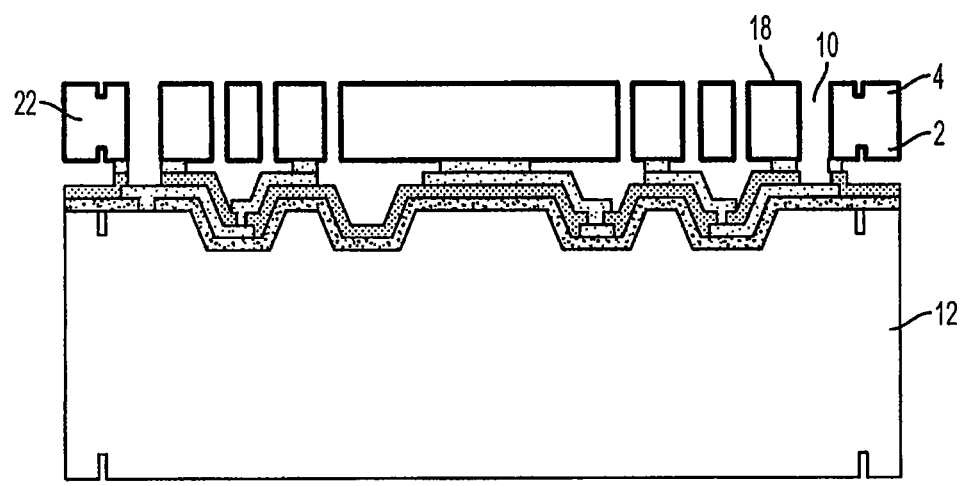
FIG. 9 is a side view of a vibrating mass.

In Step S710, vibrating mass 2 is coated with a conformal masking or insulation material 18 as shown in FIG. 9. Masking material 18 can be, for example, parylene. Parylene provides a vapor-deposited conformal coating that can be deposited at low process temperatures. The dry coating process avoids the issues of capillary adhesion forces and particulate contamination that are commonly associated with liquid-based processing. The conformal coating ensures protective masking of the areas that are desired to remain non-etched. Parylene can also be removed by dry processing using oxygen plasma, which facilitates removal after the process is completed. Other materials that provide complete coating of the device top surface to provide the masking under etch can similarly be used. For example, in another embodiment the masking material may be a metal film deposited by sputtering, evaporation, or atomic layer deposition ("ALD"). It is preferred that this material can be selectively removed upon completion of the process without damaging or degrading other parts of the device.

Figure 10:
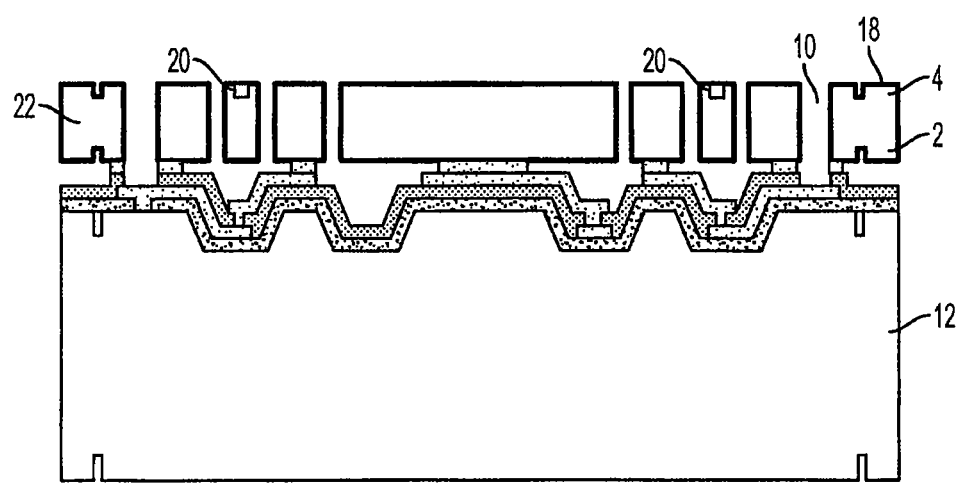
FIG. 10 is a side view of a vibrating mass.

In Step S712, select locations of masking material 18 are removed corresponding to the select locations of vibrating mass 2 as shown in FIG. 10. As shown in FIG. 10, select holes 20 are created in masking material 18 corresponding to select locations where mass from device layer 22 should be removed so that vibrating mass 2 can have the desired resonant frequencies. In one embodiment, masking or insulation material 18 is removed through laser ablation. Again the use of low energy laser ablation can be beneficial compared to the use of high energy laser ablation to reduce debris, reduce the likelihood of damage to underlying material 2, and reduce associated financial costs.

Figure 11:
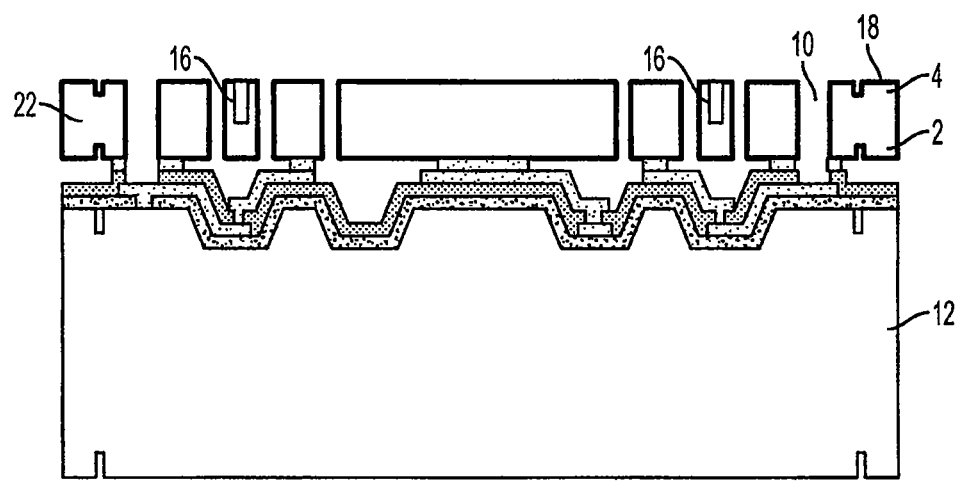
FIG. 11 is a side view of a vibrating mass.

In Step S714, vibrating mass 2 is etched to remove select amounts of mass at select locations of vibrating mass 2 forming cavities 16 as shown in FIG. 11. In one embodiment, vibrating mass 2 can be etched using deep reactive ion etching. In another embodiment, vibrating mass 2 can be etched using deep reactive ion etching using time-sequenced etch and passivate chemistries such as the Bosch process. After etching vibrating mass 2, it is contemplated that the resonant frequencies of vibrating mass 2 can be adjusted to approximately the desired resonant frequencies. For example, if vibrating mass 2 originally has a resonant frequency of 14.950 kHz on the first axis and 14.900 kHz on the second axis, but vibrating mass 2 should have a common resonant frequency of 14.900 kHz on both axes, then after etching, vibrating mass 2 could have resonant frequencies of approximately 14.900 kHz on both axes.

Figure 12:
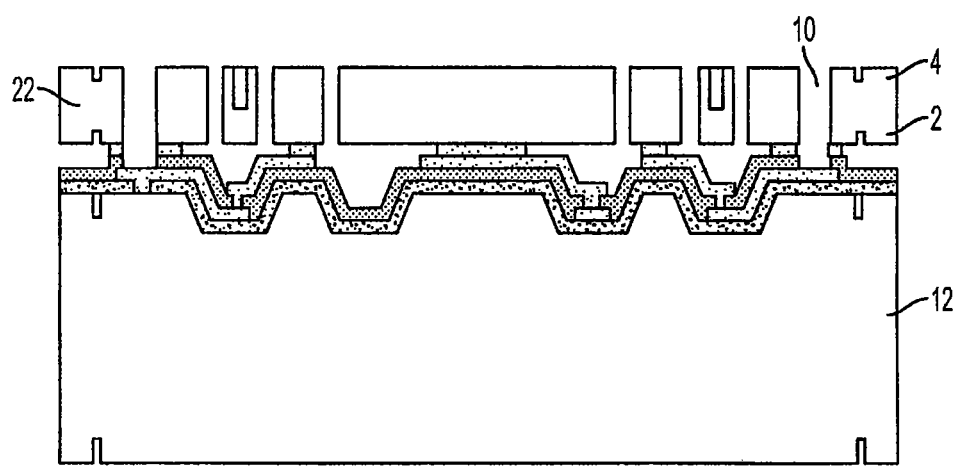
FIG. 12 is a side view of a vibrating mass.

In Step S716, the remaining masking material 18 in vibrating mass 2 is removed as shown in FIG. 12. Masking material 18 can be removed, for example, through etching. In the preferred embodiment in which the masking material is parylene, oxygen plasma etching may be used. In step S718, the process ends.

It is contemplated that any or all Steps S704 through S716 can be repeated as necessary in order to further adjust the resonant frequencies of vibrating mass 2.

It is also contemplated that the steps disclosed in FIG. 7 may be advantageously used in devices where the original masking layer must be removed prior to testing or where device over etch cannot be accommodated.

In one embodiment, the process described in FIG. 1 and FIG. 7 can be combined. That is, after the process in FIG. 1 is completed and the resonant frequencies of vibrating mass 2 still needs to be adjusted, etch mask 6 can be removed after Step S116 in FIG. 1 and instead of ending the process, the process can go to Step S704 with the addition of a layer of masking material 6. Thus, the initial frequency tuning could be accomplished using the process disclosed in FIG. 1, and subsequent fine adjustments done with the process disclosed in FIG. 7.

Advantageously the processes described in FIG. 1 and FIG. 7 permit the frequency tuning to be accomplished at the wafer scale. This allows the wafer of tuned devices to continue wafer-scale processing, preserving the cost benefits inherent to batch processing. In particular, wafer-scale vacuum packaging is an attractive process for sealing resonator devices in an environment that allows operation with high quality factor. The processes described in FIG. 1 and FIG. 7 maintain this compatibility.

What is claimed is:

1. A method for adjusting the resonant frequencies of a vibrating MEMS device comprising the steps of:
    patterning a surface of a structural layer used to form the vibrating MEMS device with a photoresist, the photoresist having open areas where the structural layer used to form the vibrating MEMS device should be etched;
    etching the structural layer used to form the vibrating MEMS device at locations corresponding to the open areas to structurally define the vibrating MEMS device;
    determining a first resonant frequency of the vibrating MEMS device along a first axis and a second resonant frequency of the vibrating MEMS device along a second axis;
    determining a first mass removal amount of the vibrating MEMS device and a first mass removal location of the vibrating MEMS device to alter the first resonant frequency and reduce a resonant frequency difference between the first resonant frequency and the second resonant frequency;
    removing the photoresist at the first mass removal location using laser ablation;
    etching the vibrating MEMS device to remove the first mass removal amount of the vibrating MEMS device at the first mass removal location of the vibrating MEMS device;
    determining a third resonant frequency of the vibrating MEMS device along the first axis and a fourth resonant frequency of the vibrating MEMS device along the second axis;
    determining a second mass removal amount of the vibrating MEMS device and a second mass removal location of the vibrating MEMS device to alter the third resonant frequency and reduce a resonant frequency difference between the third resonant frequency and the fourth resonant frequency;
    coating a portion of the surface of the vibrating MEMS device with a masking material;
    removing the masking material at the second mass removal location using laser ablation; and
    etching the vibrating MEMS device to remove the second mass removal amount of the vibrating MEMS device at the second mass removal location of the vibrating MEMS device.

2. The method of claim 1 wherein the vibrating MEMS device is a MEMS resonator.

3. The method of claim 2 wherein the MEMS resonator is a MEMS gyroscope resonator.

4. The method of claim 1 further comprising the step of removing any remaining photoresist that is patterning the surface of the vibrating MEMS device after the etching the vibrating MEMS device at the first mass removal location of the vibrating MEMS device.

5. The method of claim 1 further comprising the step of removing any remaining masking material that is coating the surface of the vibrating MEMS device after the etching the vibrating MEMS device at the second mass removal location of the vibrating MEMS device.

6. The method of claim 5 wherein the removing any remaining masking material that is coating the surface of the vibrating MEMS device is performed by oxygen plasma treatment.

7. The method of claim 1 wherein the steps of adjusting the resonant frequencies of the vibrating MEMS device is performed at a wafer scale.

8. The method of claim 1 wherein the masking material is a conformal masking material.

9. The method of claim 8 wherein the conformal masking material is selected from the family of parylenes (poly-para-xylenes).

10. The method of claim 1 wherein the etching the vibrating MEMS device at the first mass removal location of the vibrating MEMS device is performed using an etch process that minimizes material removal at locations other than the first mass removal location.

11. The method of claim 1 wherein the removing the photoresist at the first mass removal location using laser ablation is performed with an energy sufficient to remove the photoresist without damaging the structural layer used to form the vibrating MEMS device.

12. The method of claim 1 wherein the etching the vibrating MEMS device at the second mass removal location of the vibrating MEMS device is performed using an etch process that minimizes material removal at locations other than the second mass removal location.

13. The method of claim 1 wherein the etching the vibrating MEMS device at the first mass removal location or etching the vibrating MEMS device at the second mass removal location is performed using deep reactive ion etching.

14. The method of claim 1 wherein the determining the first mass removal amount of the vibrating MEMS device and the first mass removal location of the vibrating MEMS device is performed using the masking material.

15. The method of claim 1 wherein the etching the structural layer used to form the vibrating MEMS device is performed using deep reactive ion etching.

* * * * *